United States Patent
Xiong

(12) 
(10) Patent No.: US 6,352,568 B1
(45) Date of Patent: Mar. 5, 2002

(54) USE OF HYBRID RUMEX ACETOSA L. IN PRODUCTION OF FERTILIZER

(76) Inventor: Jungong Xiong, 8F, No. 110, Youhaonan Road, Urumqi, Xinjiang, 830000 (CN)

( * ) Notice: Subject to any disclaimer, the term of this patent is extended or adjusted under 35 U.S.C. 154(b) by 0 days.

(21) Appl. No.: 09/700,008

(22) PCT Filed: Dec. 30, 1998

(86) PCT No.: PCT/CN98/00317

§ 371 Date: Jan. 9, 2001

§ 102(e) Date: Jan. 9, 2001

(87) PCT Pub. No.: WO99/58473

PCT Pub. Date: Nov. 18, 1999

(30) Foreign Application Priority Data

May 12, 1998 (CN) ............................................ 98101845

(51) Int. Cl.⁷ ................................................. C05F 11/00
(52) U.S. Cl. ............................. 71/23; 71/6; 71/7; 71/8; 71/24
(58) Field of Search .............................. 71/6, 23, 24, 7, 71/8

(56) References Cited

FOREIGN PATENT DOCUMENTS

| CA | 2011148 | * | 8/1991 |
| CN | 1181289 | * | 5/1998 |
| JP | 06340537 | * | 12/1994 |
| JP | 08067616 | * | 3/1996 |
| JP | 08113515 | * | 5/1996 |

* cited by examiner

*Primary Examiner*—Chhaya D. Sayala
(74) *Attorney, Agent, or Firm*—Fulbright & Jaworski L.L.P.

(57) ABSTRACT

The present invention is concerned with an application of Lumeikesi hybrid rumex acetosa in production of agricultural fertilizer. Lumeikesi hybrid rumex is a new variety, which has high contents of protein, vitamin C and carotene. A nutrient juice of Lumeikesi hybrid rumex is added to weathered coal and converted to humic acid necessary for agricultural fertilizer, then formulated into agricultural fertilizer. The fertilizer can increase yield of crop, improve quantity of fruit and can also reduce environmental pollution and prevent humans from chemical substance.

14 Claims, No Drawings

USE OF HYBRID RUMEX ACETOSA L. IN PRODUCTION OF FERTILIZER

FIELD OF INVENTION

The invention relates to a new use of hybrid Rumex acetosa L., especially to a use in production of agricultural fertilizer.

BACKGROUND OF INVENTION

China is a big agricultural country with her population accounting for 22% that of the world while cultivable land accounting for only 7% that of the world. For meeting the requirement of cereals for population increasing, the country has been obliged to apply inorganic fertilizers with increasing annual increment on limited land to obtain high productivity. And that leads to quick decreasing of humics and microelement contents in soil, severe destruction of soil structure, fixation of various components in fertilizers by soil or loss of them, annual decreasing of effective utility, and abnormal proportion of nutritious elements in soil, which in turn contributes to decreasing of protein, sugar and various vitamins in crops and worse palate and worse quality of them.

Therefore it is now very urgent for us to provide an agricultural fertilizer which has high nutritious contents and is not harmful to soil.

An object of this invention is to provide a new use of hybrid Rumex acetosa L. in production of nutritious agricultural fertilizer.

Hybrid Rumex acetosa L. has been examined and certified by National Herbage Species Exam & Certify Committee as a new species of herbage, and a credential has been issued as a qualified national herbage species with a registered number 183. Hybrid Rumex acetosa L. is a Rumex acetosa L. of knotweed family, which belongs to perennial herb, with Rumex patientia L. as its female parent and Rumex tianschanica L. as its male parent.

Hybrid Rumex acetosa L. is a new breed of green product with high protein, high vitamin C and high carotene. It possesses series of features such as high productivity, long life, good anti-frigid and good anti-drought property, high protein content and full and balance nutrition. Variation of its nutritious contents during different growing periods is shown in following table 1.

TABLE 1

| Items | Growing period | | | | |
|---|---|---|---|---|---|
| | Leaf cluster | Stemming | Budding | Earlier flowering | Re-flowering |
| Dry substances | 8.68 | 10.79 | 10.97 | 11.90 | 12.78 |
| Protein | 38.94 | 39.81 | 29.94 | 27.81 | 20.56 |
| Nitrogen free extracts | 33.67 | 30.74 | 34.50 | 42.98 | 38.93 |
| in which Sugar | 13.54 | 9.87 | 15.39 | 5.23 | 5.71 |
| Fat | 6.07 | 5.04 | 4.54 | 3.17 | 2.27 |
| Raw fiber | 9.44 | 13.88 | 21.89 | 17.52 | 30.59 |
| Ash | 11.88 | 10.53 | 9.13 | 8.52 | 7.65 |
| Vitamin C mg/100 g | 792.05 | 760.41 | 311.86 | 149.17 | 16.72 |
| Carotene mg/100 g | 55.48 | 57.69 | 55.61 | 31.28 | 20.34 |

Analysis of their various amino acids are shown in following Table 2.

TABLE 2

| Asp | Thr | Ser | Glu | Gly | Ala | Cys | Val | Met |
|---|---|---|---|---|---|---|---|---|
| 1.219 | 0.735 | 0.785 | 3.084 | 0.880 | 0.880 | 0.145 | 1.075 | 0.078 |

| Ile | Leu | Tyr | Phe | Lys | Trp | His | Arg | Pro | Total |
|---|---|---|---|---|---|---|---|---|---|
| 0.810 | 1.313 | 0.379 | 1.122 | 1.027 | — | 0.496 | 0.797 | 0.625 | 15.45 |

In addition, hybrid Rumex acetosa L. has also very high concentration of the chlorophyll content in it, with higher concentration of organic selenium and a lot of microelements beneficial to human being health, as shown in Table 3.

TABLE 3

| Protein % | Fiber % | Fat % | Nitrogen free extracts % | Vitamin C mg/100 g | β Carotene mg/100 g |
|---|---|---|---|---|---|
| 28.72 | 12.27 | 4.54 | 36.31 | 135.64 | 41.43 |
| Ca % | Mg % | Cu µg/g | Fe µg/g | Zn µg/g | Mn µg/g |
| 1.59 | 0.062 | 10.67 | 604.99 | 59.59 | 43.36 |
| Se µg/g | | | | | |
| 0.556 | | | | | |

DESCRIPTION OF THE INVENTION

The invention provides an application of hybrid Rumex acetosa L. in production of nutritious agricultural fertilizer.

In above-mentioned application, the agricultural fertilizer is a high efficient agricultural fertilizer and can be produced as a bio-compound fertilizer or a high efficient liquid agricultural fertilizer.

In particularly, the juice squeezed from the cutting hybrid Rumex acetosa L. is heated or added with some acids into it. Then the supernatant fluid obtained by separating its precipitate is directly sprayeded on solid carriers and then fermented to get agricultural humic acid necessary for agricultural fertilizer. Thereafter suitable quantity of microelements such as N, P and K is added and eventually a nutritious agricultural fertilizer is prepared with excellent qualify and high efficiency.

The said solid carriers can be weathered coal, coal ash powder, furnace cinder and mineral slag, etc.

In the said nutritious agricultural fertilizer with excellent qualify and high efficiency, some bio-components can be added into it to get a pioneering bio-compound fertilizer with excellent qualify and high efficiency, such as nitrogen fixed microorganism, K disintegrated microorganism and P disintegrated microorganism, etc.

The supernatant liquid obtained directly from nutritious hybrid Rumex acetosa L. during the preparation of agricultural fertilizer can be directly processed to liquid fertilizer.

In addition to suitable content of nitrogen, phosphorous and potassium the fertilizer prepared by adding the juice of hybrid Rumex acetosa L. possesses also some microelements such as calcium, magnesium and zinc, especially high content of chlorophyll, to promote metabolism, intensify photo-synthesis, and increase sugar content and dry substances. Thus it can improve the ability of anti-inversions of crops, such as the ability of anti-frozen and anti-diseases, hence increasing crop productivity and quality, diminishing environment pollution and harm of chemical substances to human body. Its rich nutrition will also improve crop quality, making its taste better, promoting activation of nutrition in soil, hence making better absorption of plants, better metabolism and seed formation, and resulting in earlier mature and high productivity.

According to different soils and different crops, different recipes is applied and the application of the said fertilizer has the following results:

Changing root area environment, promoting formation of micro-cluster structure of soil, activating non-effective nutrition into effective one, increasing growing capability of the crop essentials, promoting sprouting with full and strong seedling, broadening area of nutrition absorption of crop, preventing occurring of essence lacking, flourishing essential systems, developing stem and strengthening capability of anti-lying down, elevating porosity and water holding due to formation of soil micro-clusters with effective nutrition combination, increasing utility of nutrition, making crop leaf widened and thickened, thickening surface wax layer and thus diminishing water evaporation, increasing the ability of anti-drought and keeping water and moisture in the soil, strengthening photo-synthetic activity in leaf surface due to increasing of various organic substances and thus elevating chlorophyll content which will make crops in deep green color and with high and strong stems, and fixation of nitrogen which will make the fertilizer with strong and quick absorption capability in long term. The fertilizer, which is poison free, harmless and pollution free, is an ideal one for production of organic food. It can diminish soil pollution, prevent soil-based infectious diseases and rice communicable diseases, diminish underground maggot injury, and improve ecological balance. The fertilizer improves also fruit quality, diminishes its chemical constituents, increases its organic substances, makes it taste better, and elevates sugar content. And it makes vegetables in deep green color and with fresh palate.

BEST EMBODIMENT OF THE INVENTION

EXAMPLE 1

The juice squeezed from cutting hybrid Rumex acetosa L., after being heated or added with acid, is separated from its precipitates and a supernatant liquid is obtained. The supernatant liquid is directly sprayed on solid carrier such as weathered coal. Then the liquid in the carrier is fermented into humic acid necessary for agricultural fertilizer. Added with adequate quantity of N, P, K and other microelements, a high efficient agricultural fertilizer with excellent nutrition is prepared.

In the said high efficient agricultural fertilizer with excellent nutrition, biomicroorganism such as nitrogen fixation microorganism, K disintegrated germ and P disintegrated germ is added to form an excellent pioneering biocompound fertilizer with high efficiency.

EXAMPLE 2

The juice squeezed from cutting hybrid Rumex acetosa L., after being heated or added with acid, is separated from its precipitates and a supernatant liquid is obtained. The liquid is treated by microorganism and a liquid fertilizer is directly prepared.

Industrial application

The agricultural fertilizers prepared from hybrid Rumex acetosa L. according to this invention can be produced in industry scale.

What is claimed is:

1. A process for manufacturing an agricultural fertilizer with Hybrid Rumex acetosa L. comprising the steps of:

squeezing juice form Hybrid Rumex acetosa L.;

heating the juice to form precipitate;

separating the precipitate to obtain supernatant fluid;

spraying the supernatant fluid on solid carriers; and fermenting the supernatant fluid and solid carriers to get agricultural humic acid.

2. A process according to claim 1, further comprising the step of adding a suitable quantity of nitrogen, phosphorous, and potassium as well as microelements.

3. A process according to claim 1, wherein the solid carriers are selected from the group consisting of weathered coal, coal ash powder, furnace cinder and mineral slag.

4. A process according to claim 1, wherein the supernatant fluid is directly processed to liquid fertilizer.

5. A process according to claim 1, wherein the agriculture fertilizer is high efficient agricultural fertilizer.

6. A process according to claim 1, wherein the agriculture fertilizer is biocompound fertilizer.

7. A process according to claim 6, wherein the biocompound fertilizer further comprises a nitrogen fixed microorganism, a potassium disintegrating microorganism or a phosphorous disintegrating microorganism.

8. A process for manufacturing an agricultural fertilizer with Hybrid Rumex acetosa L. comprising the steps of:

squeezing juice form Hybrid Rumex acetosa L.;

adding an acid to the juice to form precipitate;

separating the precipitate to obtain supernatant fluid;

spraying the supernatant fluid on solid carriers; and fermenting the supernatant fluid and solid carriers to get agricultural humic acid.

9. A process according to claim 8, further comprising the step of adding suitable quantity of nitrogen, phosphorous and potassium, as well as microelements.

10. A process according to claim 8, wherein the solid carriers are selected from the group consisting of weathered coal, coal ash powder, furnace cinder and mineral slag.

11. A process according to claim 8, wherein the supernatant fluid is directly processed to liquid fertilizer.

12. A process according to claim 8, wherein the agriculture fertilizer is high efficient agricultural fertilizer.

13. A process according to claim 8, wherein the agriculture fertilizer is biocompound fertilizer.

14. A process according to claim 13, wherein the biocompound fertilizer further comprises nitrogen fixed microorganism, a potassium disintegrating microorganism or a phosphorous disintegrating microorganism.

* * * * *